March 19, 1946.   R. B. RANSOM   2,396,750
UNIVERSAL JOINT
Filed March 25, 1943   2 Sheets-Sheet 1
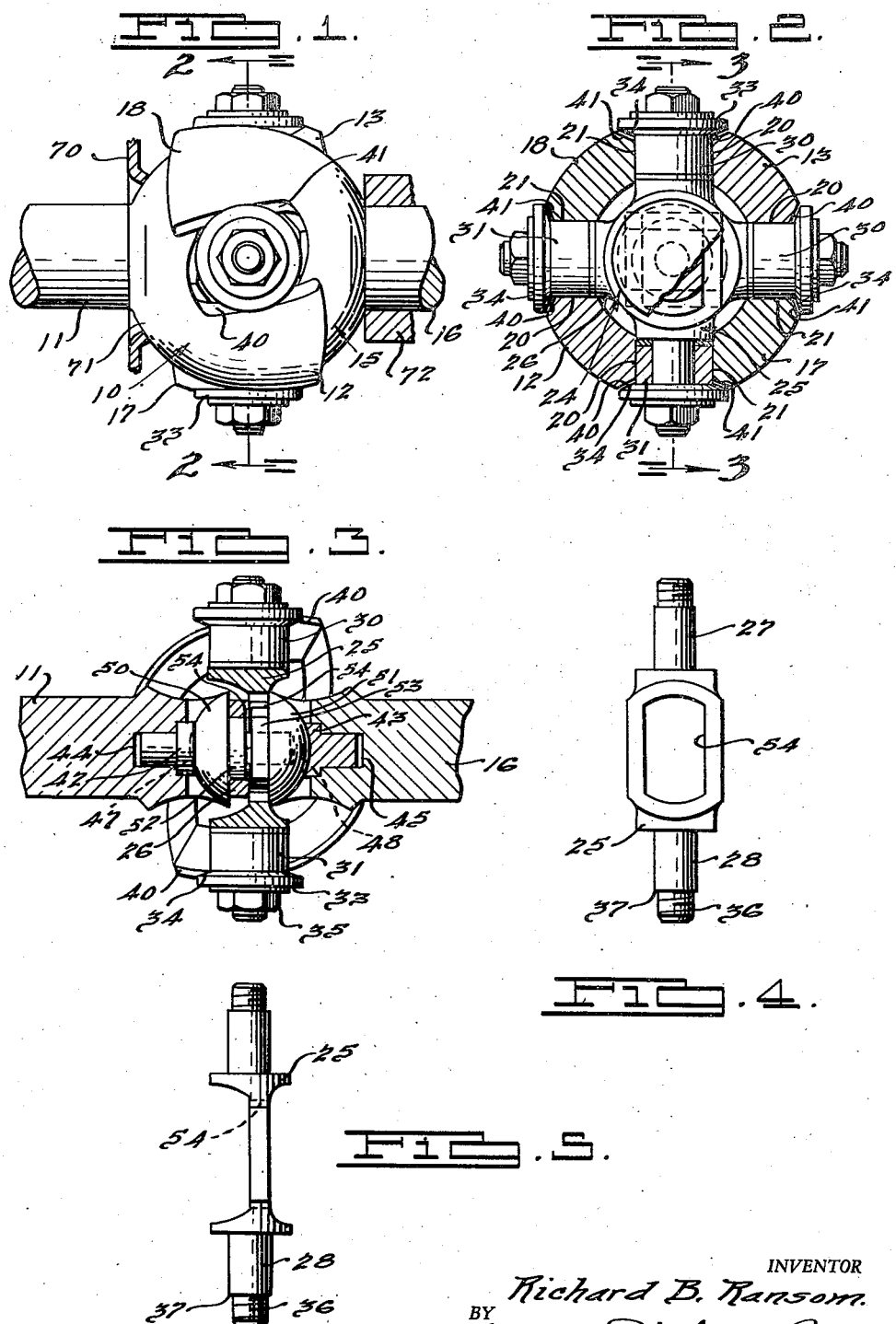
INVENTOR
Richard B. Ransom.
BY Harness, Dickey & Pierce.
ATTORNEYS.

March 19, 1946.   R. B. RANSOM   2,396,750
UNIVERSAL JOINT
Filed March 25, 1943   2 Sheets-Sheet 2
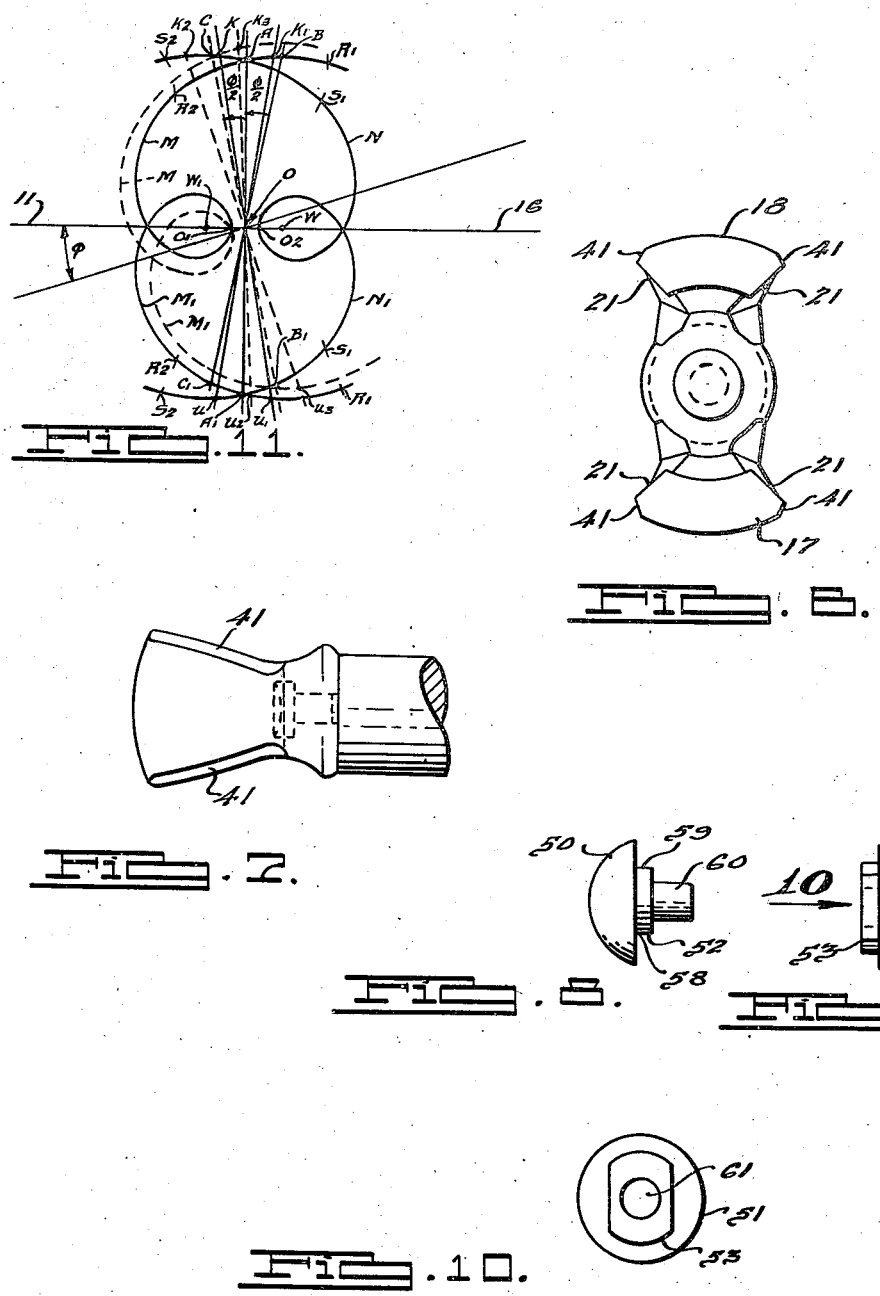
INVENTOR
Richard B. Ransom.
BY Harness, Dickey & Pierce
ATTORNEYS.

Patented Mar. 19, 1946

2,396,750

UNITED STATES PATENT OFFICE 2,396,750

UNIVERSAL JOINT

Richard B. Ransom, Knoxville, Tenn., assignor to Universal Products Company, Incorporated, Dearborn, Mich., a corporation of Delaware Application March 25, 1943, Serial No. 480,490

13 Claims. (Cl. 64—21)

The invention relates generally to universal joints for connecting a driving shaft to a driven shaft and it has particular relation to a joint wherein the angular velocity of the driven shaft is constantly equal to the angular velocity of the driving shaft.

With respect to obtaining constant velocity in a universal joint, many designs have been introduced but few have been at all practical. In certain of the designs, an intermediate member has been provided between two yokes and this intermediate member was caused to move into an angle bisecting position or plane when the shafts were moved into angled relation. For effecting this movement of the intermediate member to bisecting position, various means have been provided at the center of the joint and which have been in some manner connected to the two shafts so that the angular movement of one shaft effected movement of the intermediate member only half the angular displacement of the shaft.

Another type of constant velocity joint which has been used is the so-called ball type wherein toothed or yoke members on the two shafts had grooves in their adjacent faces receiving the balls. The grooves in the faces were generated about arcs of circles having their centers at opposite sides of the center of the joint and, accordingly, any pivotal movement of one shaft with respect to the other caused the balls to shift into a bisecting plane. It is apparent in a joint of this character that manufacture with extreme precision is difficult due to the fact that the grooves have to be curved transversely to fit the ball and at the same time longitudinally according to the arcs of the circles and this naturally is reflected in increased cost of manufacture. Furthermore, even slight variations or tolerances allow the balls to shift into non-planar positions and therefore out of the bisecting plane.

In another type of ball joint, a ball cage has been used for substantially holding the balls in the same plane so that balls on opposite sides of the center will cooperate to hold each other in the bisecting plane. A disadvantage of this type of structure is that the torque drive, instead of being through the center of the balls in a circumferential direction, is imparted in a circumferentially shearing manner to radially inner and outer parts of the balls. In other words, the driving member will exert a force against the outer half of the ball, for instance, and then the torque force would be transferred to the driven member through the inner half of the ball. Frequently, in joints of this type, the balls have broken as a result of the manner in which the torque forces were applied to the ball.

An object of the present invention is to provide a constant velocity joint of improved type which may be manufactured less expensively while possessing the important attributes of constant velocity and high torque capacity.

Another object of the invention is to provide a joint having these general characteristics wherein radially disposed rollers are employed for transmitting the torque from the driving member to the driven member and wherein the torque forces are transmitted circumferentially through the radial sides of the rollers.

Another object of the invention is to provide a constant velocity joint employing a cross connecting the two yoke members on the shaft wherein the cross is automatically shifted into a bisecting plane by improvements which facilitate manufacturing and assembling operations.

Another object of the invention is to provide an improved type of constant velocity joint using a cross having rollers thereon wherein the cross is moved into angle bisecting position automatically through engagement means on the outer ends of the trunnions with surfaces of the yokes on the shafts.

Other objects of the invention will become apparent from the following specification, from the drawings, and from the claims hereinafter set forth.

For a better understanding of the invention, reference may be had to the drawings wherein:

Figure 1 is a side elevational view of a universal joint of constant velocity character constructed according to one form of the invention;

Figure 2 is a cross-sectional view taken substantially along the line 2—2 of Figure 1;

Figure 3 is a cross-sectional view taken substantially along the line 3—3 of Figure 2;

Figures 4 and 5 show two different views of traversing trunnion members forming the cross in the universal joint;

Figure 6 is an end view of one of the yoke members;

Figure 7 is a plan view of the yoke member seen in Figure 6;

Figure 8 illustrates one part of the spherical element at the center of the cross employed for centering the cross and yoke elements;

Figure 9 is a view similar to Figure 8 illustrating another part of the spherical centering element;

Figure 10 is an end view of the part shown by Figure 9;

Figure 11 is a graphical diagram showing curves employed in shaping the yoke surfaces for obtaining the movement of the cross to bisecting position through engagement of the yoke surfaces with parts on the cross.

Referring to Figures 1 to 5, inclusive, the joint illustrated includes a left yoke 10 on a shaft 11, having diametrically opposed arms 12 and 13. A like yoke 15 on the second shaft 16 has diametrically opposed arms 17 and 18 with such arms interposed circumferentially between the arms 12 and 13 on yoke 10.

As shown best by Figure 2, the adjacent sides of each pair of arms, as for instance the arms 13 and 18, have faces 20 and 21, respectively, which are parallel to the aligned axes of the shafts and spaced equally but oppositely from a parallel plane radial to the shaft axis and located midway between them. Hence, the surfaces 20 and 21 define an axial guideway or slot between each pair of yoke arms.

A cross indicated generally by the numeral 24 interconnects the two yokes and this cross, as best illustrated in Figures 3, 4, and 5, includes identical but oppositely arranged traversing members 25 and 26, each of which has trunnions 27 and 28 on its opposite ends. Rollers 30 and 31 are provided on the trunnions of each member, respectively, and these rollers fit closely between the surfaces 20 and 21, although it will be understood that rotation and sliding of the rollers along the surfaces are permitted. At its outer end, each roller has an enlarged or collar portion 33 and this collar has an under edge 34 which is directed at an angle to the axis of the roller. A nut 35 on a reduced threaded end 36 of each trunnion serves to hold the roller in axial position and this nut abuts a shoulder 37 at the base of the threaded portion. In other words, with the nuts against the shoulders 37, the rollers may turn about the trunnion, but the distance of the surfaces 34 apart axially of the trunnions is fixed.

The inclined shoulder 34 on the rollers contacts similarly inclined surfaces 40 and 41 at the outer edge of the surfaces 20 and 21 on the yoke arms and hence when the rollers are in position, they not only may have cylindrical side wall contact with the surfaces 20 and 21 but also inclined contact with the surfaces 40 and 41. At this point, it may be mentioned that while the surfaces 20 and 21 are parallel to a radial plane, as specified, the surfaces 40 and 41 longitudinally of the shaft axes have particular curvatures and relations, such as to automatically cause the cross to shift to a bisecting position upon angling of the shafts relatively. The relation and character of these curvatures will be mentioned presently in connection with Figure 11.

For centering the two yokes, centering buttons 42 and 43 are provided in openings 44 and 45 at the inner ends of the two shafts 11 and 16, and these centering buttons have spherical cavities or seats indicated at 47 and 48, respectively. The centering surfaces of the buttons contact spherically surfaced elements 50 and 51, respectively, which, as best shown by Figures 8 and 9, have projections 52 and 53 on their adjacent faces adapted, respectively, to fit in openings 54 (see Figure 4) in the two cross elements 25 and 26. Each opening 54 is elongated and provided with parallel sides, and the projection 52 on part 50 has opposed parallel faces 58 and 59 adapted substantially to fit between the two surfaces of the opening in cross member 26, so as to slide relative thereto. Likewise, the projection 53 has opposed flat surfaces parallel in character adapted to slidably fit between the parallel sides of the opening 54 in the other cross member 25. A pin element 60 on the part 50 is adapted to project into a corresponding opening 61 in the part 51 so as to center the two parts and anchor them together with their spherical surfaces concentric.

It is to be understood that the thickness of the central portions of the two elements 25 and 26 closely corresponds to the distance between the two inner faces of the elements 50 and 51 and that with the parts in the position shown in Figure 3, the spherical surfaces 50 and 51 in reality form a ball or sphere locating the spherical center of the joint. It will also be appreciated that each element 25 and 26 may move along its axis and that they may shift circumferentially. In other words, the two members 25 and 26 may move relatively in scissors fashion and at the same time each member may move along its own trunnion axis.

For effecting movement of the cross into angle bisecting position, the surfaces 40 and 41, as mentioned previously, have particular curvatures so as to automatically effect this action. Referring to Figures 2 and 11, the surface 40 on the arm 13 corresponds to portions $R_1$, $R_2$ of curve M in Figure 11 and the surface 41 on arm 18 corresponds to portion $S_1$, $S_2$ of curve N. The curves M, N are Archimedes spirals centered respectively at $O_1$ and $O_2$ spaced equally from the center O of the joint with center $O_1$ on the axis of shaft 11 and the center $O_2$ on the axis of shaft 16. These spirals intersect at the point A located on a normal to the shaft axis when aligned and intersecting center O. Likewise, the surfaces 40 and 41 on the members 12 and 17, respectively, form similar portions of Archimedes spirals $M_1$ and $N_1$ centered at $O_1$ and $O_2$. The intersection of these spirals is at the point $A_1$ and this point also intersects the mentioned normal line extending from A to the center O. It will be perhaps noted that the scale of the diagram shown in Figure 11 is slightly larger than the size of the joint shown in Figures 1 and 2 and this variation is present for the purpose of clarity.

The spirals are Archimedes spirals denoted by the equation $R = A\theta$ as will be understood, with the centers respectively at $O_1$ and $O_2$. The points $KK_1$ indicate points of contact of the roller 30 on member 25 with the surfaces 40 and 41 at the upper end of the member while the points $UU_1$ indicate points of contact at the lower end of member 25 when the axes of the shafts are aligned. A and $A_1$ are the points of intersection of the curves MN with the shaft axes aligned. The distances $KU_1$ and $K_1U$ are equal since manifestly the rollers will contact the surfaces 40 and 41 at points equally spaced from A and from $A_1$ on the curves.

If it be assumed now that the shaft 11, Figure 11, is moved through any angle $\phi$, the cross in order to obtain constant velocity must move through an angle of $\phi/2$. Since the spirals M and M' are carried by the yoke arms 13, 12 on shaft 11, these spirals will turn about the center O of the joint and will move into the positions indicated by the broken lines M, M'. Since it is a fundamental principle or truth in relation to the Archimedes spiral that the rise or fall of the curve through progressive angles of equal size is the same, a point on curve M to the right of the point A must rise beyond the point A an amount equal to the rise of a point correspondingly positioned to the left of A on the curve N. Thus, if we assume that the shaft 11 has moved through an angle of $\phi$, it is only necessary to prove that the point of intersection A between curves M and N moves from A to a new point C displaced therefrom by an angle of $\phi/2$. Likewise, it is only necessary to prove that at the lower side, the intersection A' moves through an angle of $\phi/2$ to a new intersection point B'.

Since M and N are identical curves taken about centers $O_1$ and $O_2$ equally spaced from the joint center O, the point B on curve M which is separated by $\phi/2$ from the original point A must move beyond the opposite side of the point A an amount equal to $\phi/2$ and point B must reach the new point C on broken line spiral M since $OB=OC$. The intersection of the broken line curve M at the curve N must be at the point C because the rise of N to the left of A is the same as the rise of M to the right of A and therefore $OB=OC$. Similarly, the point $A_1$ at the lower side must move to the point $B_1$, since $OC_1=OB_1$. It follows that $B_1C$ is equal to $A_1A$, and to $BC_1$.

The points of contact $KK_1$ of roller 30 at the top of member 25 will shift respectively to $K_2K_3$ equally spaced from the new point of intersection C and lying on curve N and broken line curve M and likewise the points of contact $UU_1$ of the lower roller 31 will shift respectively to $U_2U_3$ equally spaced from the new intersection point B'. Since $KU_1=K_1U$ and $B_1C=AA_1=BC_1$, it follows that $K_2U_3=K_3U_2=KU_1=K_1U$.

Therefore the distance between the rollers on member 25 may be constant through angular movement of the shaft 11. Since the angle B is any arbitrary angle within reasonable limits of joint operation, it becomes apparent that the rollers, since they are governed by the points of contact with the spiral surfaces, must move from points of contact A and $A_1$ to any new points of contact, or if the shaft 11 should be tilted in the opposite direction, the rollers may move to any new points of contact with the member 25 bisecting the angle of tilting. Angling of the shaft 16 would accomplish the same results, only in this case spirals N and $N_1$ would move, or, in other words, surfaces 41 and 40 on arms 18 and 17 would shift so as to move cross member 25 into bisecting position.

The same curvatures and relations are obtained at the ends of cross member 26 and if shaft 16 or shaft 11 is angled or tilted in a direction perpendicular to the paper in Figure 11, the member 26 will be shifted into angle bisecting position.

Thus, it will be understood that the arm 13 has like spiral surfaces 40, 40 corresponding to spiral M but disposed in planes parallel to its surfaces 20 and 20, respectively; the arm 12 likewise has surfaces 40, 40 corresponding to spiral $M_1$ but disposed in planes parallel to its surfaces 20 and 20, respectively; the arm 18 has surfaces 41, 41 corresponding to spiral N but disposed in planes parallel to its surfaces 21, 21, respectively; and the arm 17 has surfaces 41, 41 corresponding to spiral $N_1$ but disposed in planes parallel to its surfaces 21, 21, respectively. In other words, if the diagram in Figure 11 is turned through 90° about the shaft axis, the relation of surfaces and rollers at the ends of member 26 will be obtained.

The surfaces 40, 41 in reality constitute portions $R_1R_2$ and $S_1S_2$ of a series of progressively larger spirals as will be readily understood. These portions of the spirals almost identically correspond to circular arcs centered at W and $W_1$ so that for practical purposes arcs of circles centered at $WW_1$, or at other points equally spaced from O may be used. The spirals too may be centered at $O_1O_2$ or at other points spaced equally from O or they may be centered at O. Due to the fact that the cone center of the roller surface 34 and the cone center of the surfaces 40 and 41 are not the same, point contacts of the roller with such surfaces 40 and 41 will be obtained. If line contact is desired, this may be obtained by using a rotating cutter roller having cutting edges forming a cutting surface shaped in correspondence with the roller surface 34 and then while rotating this roller, swinging the arm 13, for instance, about the center W. This will form the inclined surface 40 substantially corresponding to spiral portions $R_1R_2$ but obtaining line contact with the inclined side of the cutter roller. It will be apparent that if the cutter roller is pressed against any point contact on surface 40, the point contact will be changed to contact extending across the entire width of the surface 40. Then upon progressive movement of the entire surface 40 along the cutter, the surface generated would be such that at any position, the roller surface 34 would have line contact across the width of the surface.

It has been stated heretofore that the cross members 25 and 26 can turn circumferentially in a relative manner in scissors fashion and the reason for obtaining this scissors action is to permit movement of either shaft member about joint diameters between the axes of the two cross members or to move about both of said axes. Considering Figures 1, 2 and 3, let it be assumed first that the shaft member 11 is angled upwardly about the axis of the cross member 26. This movement will effect shifting of the cross member 25 through an angle equal to half the angle the shaft member is moved so that the cross now is in a bisecting plane. With the shaft 11 in this angled position, movement of the shaft now about the axis of the member 25 so positions the yoke member 13 that clearance exists circumferentially between the edges of such yoke member and the rollers adjacent thereto. As a result, the distance circumferentially between the rollers 30, 30 at the edges of arm 13 can be decreased. Similarly, the edges of yoke member 12 move into positions wherein the rollers at its edges are farther apart circumferentially than such edges and, as a result, the rollers can move circumferentially toward each other.

Due to the fact that the cross is shifted into a bisecting position upon the upward movement of the shaft member 11 about the axis of cross member 24, and then is tilted about the axis of cross member 25 when the shaft is tilted again, the rollers 30 and 31 at opposite edges of the arm 18 must move farther apart circumferentially. Likewise, the rollers 30 and 31, at opposite edges of the yoke arm 17, must move farther apart circumferentially. In other words, movement of the cross first about the axis of cross member 26 into the bisecting position and then about the axis of cross member 25 in angle bisecting relation to the second angular movement of the shaft 11 requires that the rollers 30 and 31, at opposite edges of the yoke arm 18, move farther apart, and that the rollers 30 and 31 at opposite edges of the yoke arm 17 be moved farther apart. This movement compensates for the clearance between the rollers 30 and 30 and the yoke arm 13 and the clearance between the rollers 31 and 31 and the yoke arm 12. As a result, the two parts of the cross act in a scissors fashion to maintain contact between the rollers and yoke arms, and furthermore, this scissors action permits the cross to move into the bisecting position.

The movement of the shaft 11 in the manner indicated corresponds to movement of the shaft member about an axis diametrical to the joint and passing between the two cross members. It follows that movement of either shaft member about any axis diametrical to the joint center will cause the cross to shift into a bisecting plane and at the same time the two cross members may move radially, or radially and in scissors fashion, depending upon the movement. Hence, during operation of the joint with either shaft at an angle to the other, the cross will shift into a bisecting plane and the cross members will shift radially and in scissors fashion as will be required during each revolution of the joint.

It will be appreciated that if the shaft 11 is angled with respect to the shaft 16, the axis of angling or diameter of the cross about which the shaft 11 is angled will progressively travel circumferentially of the cross during each revolution and hence shifting of the cross members radially and in scissors fashion will occur, depending upon the cross diameter about which the shaft 11 is tilted at any instant.

In the universal joint that has been described, it will be appreciated that the conical or inclined surface 34 on the rollers normally engages the surfaces 40 and 41 at points or lines lower, or, in other words, the surfaces on one yoke rise at one side of the contact while the surfaces on the other yoke rise at the other side of the contact. Hence, movement of the two shaft members apart axially is prevented. If found desirable, however, a bearing 70 may be provided for contact with a spherical surface 71 having its center at the joint center may be employed in conjunction with a plain bearing 72 in which the shaft 16 is journalled. It will be seen that the shaft 11 may pivot in any direction that may be required and that during any pivotal movement, members 70 hold the yoke 10 against movement to the left.

While the joint described employs particularly Archimedes spirals with centers spaced from the joint center, such centers of the spirals as stated heretofore may also coincide with the joint center. Other spirals might be used too, providing the rise of the curve at opposite sides is equal and the diametrical distance between the intersecting points remains constant during tilting of the shaft. Involutes of a circle centered at the joint center also provide intersecting curves which will effect these results. Arcs of circles centered at points equally spaced from O, as at $WW_1$, may be used but as stated before, these are practically identical to the portions of the spirals indicated.

It is to be noted in a joint of this type (referring to Figs. 1 and 2, for instance), that if shaft 11 is the driving shaft and is rotating at constant speed in clockwise direction as seen in Fig. 2, the torque or load is conveyed by the lower edge of arm 13 acting against roller 30 on member 24 and by the upper edge of arm 12 acting against roller 31 on member 24. These rollers then act against arms 18 and 17 so as to turn shaft 16. Hence, the drive is through the rollers on cross member 24 only and, since this member travels in the bisecting plane, constant velocity is obtained in shaft 16. If shaft 11 is reversed in rotation, the load is conveyed only through the rollers on cross member 25 and, since this member also travels in the bisecting plane, constant velocity is obtained in shaft 16 when shaft 11 is reversed and turns with constant velocity. The same type of action is obtained if shaft 16 does the driving.

In each case, then, there is only one trunnion driving axis—namely, the one at the advance sides or edges of the driving yoke arms. The other trunnion axis moves in the bisecting plane too and may become the driving axis at any time, depending upon which shaft is driving and the direction of rotation. It will be realized that the cross members themselves do not carry the load but instead that the rollers on the driving axis directly take the load. In other words, the torque is transmitted directly from each driving yoke arm through the roller and against the driven yoke arm. During driving through the rollers of the one trunnion axis, the rollers on the other trunnion axis are under no load and may roll or slide along the slots between the yoke arms without any torque pressure.

Although more than one form of the invention has been illustrated and described in detail, it will be apparent to those skilled in the art that various modifications may be made without departing from the scope of the appended claims.

What I claim is:

1. A constant velocity joint comprising a pair of shaft elements, a connecting element on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting the trunnions at their inner ends so as to permit each trunnion to shift along its own axis and to move circumferentially of the joint in scissors relation to adjacent trunnions while maintaining all trunnions in the same plane, means on the connecting elements and cooperating with said movable connecting means for centering the shaft and connecting elements on a joint center in the plane of the trunnions and which coincides with the intersection of the two axes of the shaft elements, and interengaging surfaces on the trunnions and on the arms for effecting swinging of the trunnions into a plane bisecting the angle between the shaft axes when either shaft is tilted relative to the other about said joint center.

2. A constant velocity joint comprising a pair of shaft elements, a connecting element on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting the trunnions at their inner ends so as to permit each trunnion to shift along its own axis and to move circumferentially of the joint in scissors relation to adjacent trunnions while maintaining all trunnions in the same plane, means on the connecting elements and cooperating with said movable connecting means for centering the shaft and connecting elements on a joint center in the plane of the trunnions and which coincides with the intersection of the two axes of the shaft elements, and means including curved surfaces on the arms and elements on the trunnions engaging such surfaces for shifting the trunnions into a plane bisecting the angle between the two shaft axes when either shaft element is tilted relative to the other about the joint center.

3. A constant velocity joint comprising a pair of shaft elements, a connecting element on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting the trunnions at their inner ends so as to permit each trunnion to shift along its own axis and to move circumferentially of the joint in scissors relation to adjacent trunnions while maintaining all trunnions in the same plane, means on the connecting elements and cooperating with said movable connecting means for centering the shaft and connecting elements on a joint center in the plane of the trunnions and which coincides with the intersection of the two axes of the shaft elements, and means including curved surfaces on the arms and elements on the trunnions engaging such surfaces for shifting the trunnions into a plane bisecting the angle between the two shaft axes when either shaft element is tilted relative to the other about the joint center, said curved surfaces on the arms of one connecting member being centered on the axis of such member but at a predetermined distance from the joint center at one side thereof and the curved surfaces on the arms of the other connecting member being centered on the axis of such other member but spaced the same distance beyond the opposite side of the joint center.

4. A constant velocity joint comprising a pair of shaft elements, a connecting element on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting the trunnions at their inner ends so as to permit each trunnion to shift along its own axis and to move circumferentially of the joint in scissors relation to adjacent trunnions while maintaining all trunnions in the same plane, means on the connecting elements and cooperating with said movable connecting means for centering the shaft and connecting elements on a joint center in the plane of the trunnions and which coincides with the intersection of the two axes of the shaft elements, and means including curved surfaces on the radially outer sides of the arms and collar elements on the trunnions engaging such surfaces for effecting swinging of the trunnions into a plane bisecting the angle between the two shaft axes when either shaft is tilted relative to the other about said joint center.

5. A constant velocity joint comprising a pair of shaft elements, a connecting element on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting the trunnions at their inner ends so as to permit each trunnion to shift along its own axis and to move circumferentially of the joint in scissors relation to adjacent trunnions while maintaining all trunnions in the same plane, means on the connecting elements and cooperating with said movable connecting means for centering the shaft and connecting elements on a joint center in the plane of the trunnions and which coincides with the intersection of the two axes of the shaft elements, and means including spirally curved surfaces on the arms and elements on the trunnions engaging such surfaces for effecting swinging of the trunnions into a plane bisecting the angle between the two shaft axes when either shaft is tilted relative to the other about said joint center.

6. A constant velocity joint comprising a pair of shaft elements, a connecting element on each shaft element and having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting all of the trunnions at their inner ends so as to permit each trunnion to move circumferentially of the joint in scissors relation to adjacent trunnions while maintaining all trunnions in the same plane, means on the connecting elements and cooperating with said movable connecting means for centering the shaft elements and connecting elements on a joint center in the plane of the trunnions and which coincides with the intersection of the two axes of the shaft elements, and means including curved surfaces on the arms and collar elements on the trunnions engaging such surfaces for shifting the trunnions into a plane bisecting the angle between two shaft axes when either shaft element is tilted relative to the other about the joint center, the surfaces on the arms of one connecting element having a center on the axis of its shaft element but spaced a predetermined distance from the joint center and the surfaces on the arms of the other connecting element having a center on the axis of its shaft element but spaced a like distance from the joint center but at the opposite side thereof, each of said collar elements being movable axially along the axis of its trunnion.

7. A constant velocity joint comprising a pair of shaft elements, a connecting element on each shaft element having diametrically opposed arms with the arms on one connecting element projecting axially between the arms on the connecting element with the circumferentially opposite edges of each arm spaced from the adjacent arms in order to provide an axially elongated slot between each arm on one element and the adjacent arms on the other element with the slots arranged in diametrically opposing pairs so that each slot is diametrically opposite another slot, trunnions projecting radially outwardly into the slots, respectively, with each pair of diametrically opposed trunnions forming the ends of a crossing member, means connecting the crossing members intermediate their inner ends so as to permit each crossing member to move circumferentially of the joint in scissors relation to an adjacent crossing member and to move along its own trunnion axis while maintaining all trunnions in the same plane, means for centering the arms on a joint center coinciding with the intersection of the axes of the crossing members and the intersection of the axes of the shaft, and means including collar elements on the outer ends of the trunnions and overlapping curved surfaces on the adjacent arms for effecting movement of the trunnions about the joint center into a plane bisecting the angle between the axes of the shaft elements when either shaft element is tilted relative to the other, said collar elements on each crossing member being separated a fixed distance apart axially of their trunnions.

8. A constant velocity joint comprising a pair of shaft elements, a connecting element on each shaft element having diametrically opposed arms with the arms on one connecting element projecting axially between the arms on the other connecting element with the circumferentially opposite edges of each arm spaced from the adjacent arms in order to provide an axially elongated slot between each arm on one element and the adjacent arms on the other element with the slots arranged in diametrically opposing pairs so that each slot is diametrically opposite another slot, trunnions projecting radially outwardly into the slots, respectively, with each pair of diametrically opposed trunnions forming the ends of a crossing member, means connecting the crossing members intermediate their inner ends so as to permit each crossing member to move circumferentially of the joint in scissors relation to an adjacent crossing member and to move along its own trunnion axis while maintaining all trunnions in the same plane, means for centering the arms on a joint center coinciding with the intersection of the axes of the crossing members and the intersection of the axes of the shafts, and means including collar elements on the outer ends of the trunnions and overlapping curved surfaces on the adjacent arms for effecting movement of the trunnions about the joint center into a plane bisecting the angle between the axes of the shaft elements when either shaft element is tilted relative to the other, said collar elements on each crossing member being separated a fixed distance apart axially of their trunnions, the curved surfaces on the arms on one connecting element being centered at a point on the axis of such element and at a predetermined distance from the joint center and the curved surfaces on the arms of the other connecting element being centered at a point on the axis of the latter but at the opposite side of the joint center the same predetermined distance.

9. A constant velocity joint comprising a pair of shaft elements, a connecting element on each shaft element having diametrically opposed arms with the arms on one connecting element projecting axially between the arms on the other connecting element with the circumferentially opposite edges of each arm spaced from the adjacent arms in order to provide an axially elongated slot between each arm on one element and the adjacent arms on the other element with the slots arranged in diametrically opposing pairs so that each slot is diametrically opposite another slot, trunnions projecting radially outwardly into the slots, respectively, with each pair of diametrically opposed trunnions forming the ends of a crossing member, means connecting the crossing members intermediate their inner ends so as to permit each crossing member to move circumferentially of the joint in scissors relation to an adjacent crossing member and to move along its own trunnion axis while maintaining all trunnions in the same plane, means for centering the arms on a joint center coinciding with the intersection of the axes of the crossing members and the intersection of the axes of the shafts, rollers on the trunnions and substantially contacting the sides of the slots, and means including collar elements on the trunnions and overlapping curved surfaces on the adjacent arms for effecting movement of the trunnions about the joint center into a plane bisecting the angle between the axes of the shaft elements when either shaft element is tilted relative to the other, the curved surfaces on the arms on one connecting element being substantially centered at a point on the axis of such element and at a predetermined distance from the joint center and the curved surfaces on the arms of the other connecting element being centered at a point on the axis of the latter but at the opposite side of the joint center the same predetermined distance, said collar elements on each crossing member being separated a fixed distance apart axially of their trunnions.

10. A constant velocity joint comprising a pair of shaft elements, a connecting element on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting the trunnions so as to permit each trunnion to shift along its own axis and to move circumferentially of the joint in scissors relation to adjacent trunnions while maintaining all trunnions in the same plane, means on the connecting elements and cooperating with said movable connecting means for centering the shaft and connecting elements on a joint center in the plane of the trunnions and which coicides with the intersection of the two axes of the shaft elements, and interengaging surfaces on the trunnions and on the arms for effecting swinging of the trunnions into a plane bisecting the angle between the shaft axes when either shaft is tilted relative to the other about said joint center.

11. A constant velocity joint comprising a pair of shaft elements, a connecting element on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, trunnions projecting radially outwardly from the joint axis into the slots respectively, means movably connecting the trunnions so as to permit each trunnion to shift along its own axis and to move circumferentially of the joint in scissors relation to adjacent trunnions while maintaining all trunnions in the same plane, means for centering the shaft and connecting elements on a joint center in the plane of the trunnions and which coincides with the intersection of the two axes of the shaft elements, and interengaging surfaces on the trunnions and on the arms for effecting swinging of the trunnions into a plane bisecting the angle between the shaft axes when either shaft is tilted relative to the other about said joint center.

12. A constant velocity joint comprising a pair of shaft elements, a connecting element on each shaft element having diametrically opposed arms with the arms on one connecting element projecting axially between the arms on the connecting element with the circumferentially opposite edges of each arm spaced from the adjacent arms in order to provide an axially elongated slot between each arm on one element and the adjacent arms on the other element with the slots arranged in diametrically opposing pairs so that each slot is diametrically opposite another slot, trunnions projecting radially outwardly into the slots, respectively, with each pair of diametrically opposed trunnions forming the ends of a crossing member, means connecting the crossing members intermediate their inner ends so as to permit each crossing member to move circumferentially of the joint in scissors relation to an adjacent crossing member and to move along its own trunnion axis while maintaining all trunnions in the same plane, means for centering the arms on a joint center coinciding with the intersection of the axes of the crossing members and the intersection of the axes of the shaft, and means for effecting movement of the trunnions about the joint center into a plane bisecting the angle between the axes of the shaft elements when either shaft element is tilted relative to the other.

13. A constant velocity joint comprising a pair of shaft elements, a connecting element on each shaft element having diametrically opposed arms with the arms on one connecting element projecting axially between the arms on the connecting element with the circumferentially opposite edges of each arm spaced from the adjacent arms in order to provide an axially elongated slot between each arm on one element and the adjacent arms on the other element with the slots arranged in diametrically opposing pairs so that each slot is diametrically opposite another slot, trunnions projecting radially outwardly into the slots, respectively, with each pair of diametrically opposed trunnions forming the ends of a crossing member, said crossing members being arranged so as to permit each crossing member to move circumferentially of the joint in scissors relation to an adjacent crossing member and to move along its own trunnion axis while maintaining all trunnions in the same plane, means for centering the arms on a joint center coinciding with the intersection of the axes of the crossing members and the intersection of the axes of the shaft, and means for effecting movement of the trunnions about the joint center into a plane bisecting the angle between the axes of the shaft elements when either shaft element is tilted relative to the other.

RICHARD B. RANSOM.